US010732701B1

(12) United States Patent
Yong et al.

(10) Patent No.: US 10,732,701 B1
(45) Date of Patent: Aug. 4, 2020

(54) METHOD AND APPARATUS OF DUAL THRESHOLD CLOCK CONTROL

(71) Applicant: MediaTek Singapore Pte. Ltd., Singapore (SG)

(72) Inventors: Lee-Kee Yong, San Jose, CA (US); Rolf Lagerquist, San Jose, CA (US); Hugh Thomas Mair, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 16/449,752

(22) Filed: Jun. 24, 2019

(51) Int. Cl.
*G06F 1/324* (2019.01)

(52) U.S. Cl.
CPC .................................... *G06F 1/324* (2013.01)

(58) Field of Classification Search
CPC ....................................................... G06F 1/324
USPC ......................................................... 327/114
See application file for complete search history.

(56) References Cited

U.S. PATENT DOCUMENTS

| 2004/0183613 | A1* | 9/2004 | Kurd ........................ G01K 7/32 331/186 |
| 2011/0074468 | A1* | 3/2011 | Hsu ............................ G06F 1/08 327/101 |
| 2014/0254734 | A1* | 9/2014 | Abdelmoneum ..... H03L 7/0995 375/376 |
| 2015/0002197 | A1* | 1/2015 | Chatterjee ............... H03L 7/095 327/159 |
| 2017/0031405 | A1* | 2/2017 | Zhuang ..................... G06F 1/28 |
| 2017/0068296 | A1* | 3/2017 | Mair ......................... G06F 1/28 |
| 2017/0300080 | A1* | 10/2017 | Jain ........................... H03L 7/06 |
| 2018/0284828 | A1* | 10/2018 | Mosalikanti ........... H03L 7/093 |
| 2020/0007082 | A1* | 1/2020 | Robinson ................. G05F 1/10 |
| 2020/0050251 | A1* | 2/2020 | Naik ....................... G06F 1/324 |

\* cited by examiner

*Primary Examiner* — Tomi Skibinski
(74) *Attorney, Agent, or Firm* — Han IP PLLC; Andy M. Han (57) ABSTRACT

Various examples with respect to dual threshold clock control are described. A method involves sensing an input voltage of a processing circuit with a first mechanism and a second mechanism different from the first mechanism. The method also involves regulating a first droop of the input voltage using the first mechanism. The method further involves regulating a subsequent droop of the input voltage after the first droop using the second mechanism.

20 Claims, 5 Drawing Sheets

| Maximum Gating % | Clock Division Ratio | Timing Protect? | Droop-Enable Pattern |
|---|---|---|---|
| Gating Disabled | 1.0 | No | 1 |
| 25% | 0.3 | No | 0111 |
| 33% | 0.3 | No | 011 |
| 50% | 2.0 | Yes | 01 |
| 66% | 1.5 | Yes | 001 |
| 75% | 1.3 | Yes | 0001 |

Note:
* Timing Protect: No consecutive clocks during voltage droop

Sense an input voltage of a processing circuit with a first mechanism and a second mechanism different from the first mechanism
510

Regulate the input voltage
520

Regulate a first droop of the input voltage using the first mechanism
522

Regulate a subsequent droop of the input voltage after the first droop using the second mechanism
524

FIG. 5

METHOD AND APPARATUS OF DUAL THRESHOLD CLOCK CONTROL

TECHNICAL FIELD

The present disclosure is generally related to mobile communications and, more particularly, to dual threshold clock control.

BACKGROUND

Unless otherwise indicated herein, approaches described in this section are not prior art to the claims listed below and are not admitted as prior art by inclusion in this section.

Conventionally, a power management integrated circuit (PMIC) is utilized in electronic devices, such as system-on-chip (SoC) devices, for power management. The response time of remote sensing with PMIC for loopback is typically 0.5 microseconds (μs) or more. However, in high-frequency applications, such response time tends to be excessively long and, hence, PMIC would not be able to suppress voltage droop in high-frequency applications.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

In one aspect, a method may involve sensing an input voltage of a processing circuit with a first mechanism and a second mechanism different from the first mechanism. The method may also involve regulating a first droop of the input voltage using the first mechanism. The method may further involve regulating a subsequent droop of the input voltage after the first droop using the second mechanism.

In another aspect, an apparatus may include a dual threshold clock control (DTCC) circuit that includes a first mechanism and a second mechanism. The DTCC circuit may be capable of sensing an input voltage of a processing circuit. The DTCC circuit may be also capable of regulating a first droop of the input voltage using the first mechanism. The DTCC circuit may be further capable of regulating a subsequent droop of the input voltage after the first droop using the second mechanism.

It is noteworthy that, although description provided herein may be in the context of certain technologies and/or applications such as central processing unit (CPU), graphics processing unit (GPU) and vision processing unit (VPU), the proposed concepts, schemes and any variation(s)/derivative(s) thereof may be implemented in, for and by other types of technologies and/or applications. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

An objective of the present disclosure is to provide a solution, scheme, concept and/or technique to prevent or otherwise mitigate a first droop and a subsequent droop (e.g., a second droop and even a third droop), or a direct-current (DC) droop. Under a proposed scheme in accordance with the present disclosure, a combination of discrete-time ripple correlation correction (DRCC), to prevent or otherwise mitigate the first droop, and supply voltage scanning, to prevent or otherwise mitigate the subsequent droop, may be utilized so as to benefit from both DRCC and supply voltage scanning.

Figure 1:
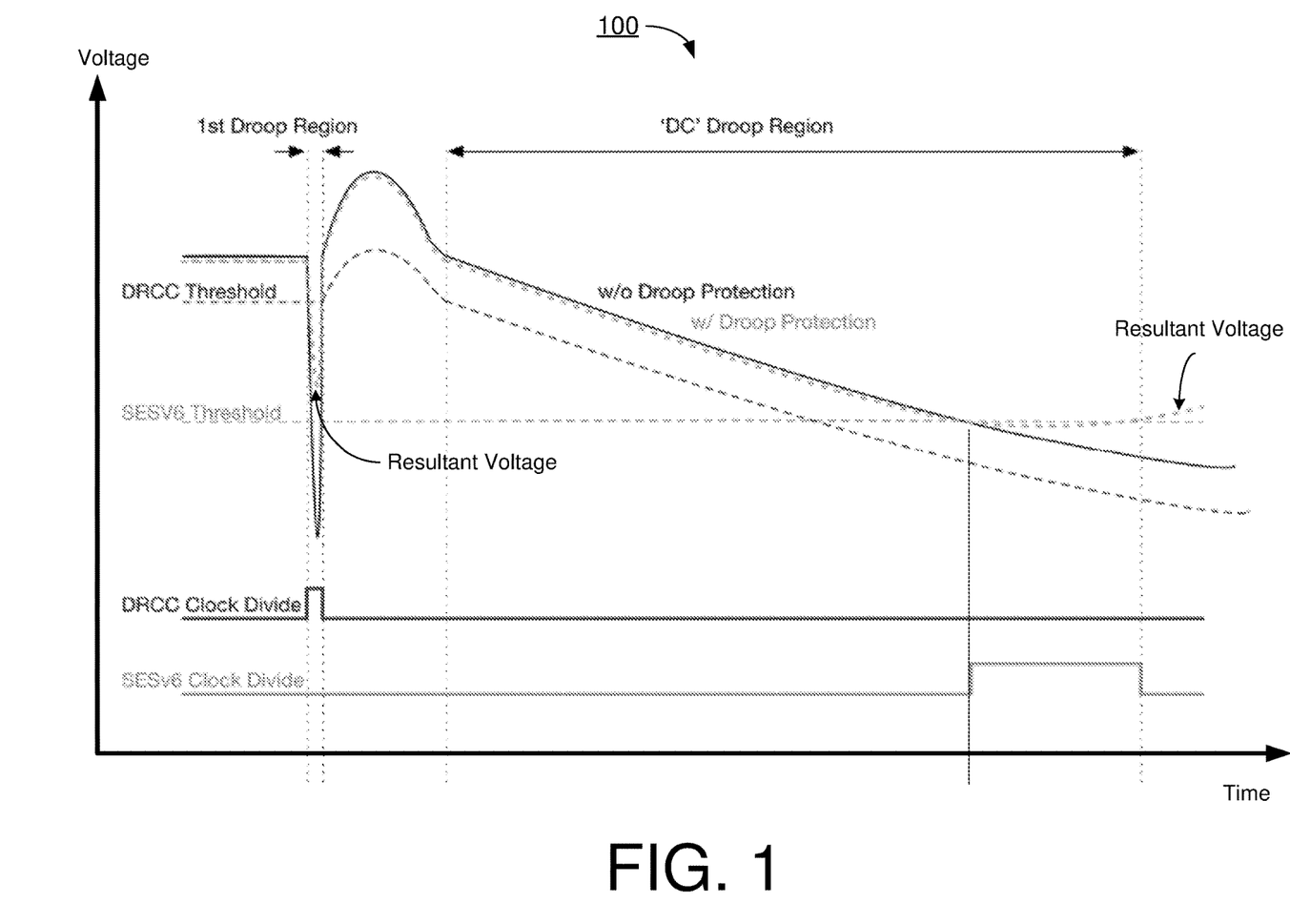
FIG. 1 is a diagram of an example scenario in accordance with an implementation of the present disclosure.

FIG. 1 illustrates an example scenario 100 of dual threshold clock control in accordance with an implementation of the present disclosure. In scenario 100, a combination of DRCC and supply voltage scanning is utilized to provide dual threshold clock control to prevent or otherwise mitigate droops in a voltage in concern (e.g., input voltage to a processing circuit being protected).

The technique of DRCC involves high-speed sampling and tracking of a delta voltage with respect to a voltage level of a voltage (e.g., input voltage to the processing circuit being protected) that is being sensed/monitored and regulated. When a droop in the monitored voltage level is sensed, DRCC sends a clock gating signal (labeled as "DRCC clock divide" in FIG. 1) to dither a clock frequency of the voltage in concern. That is, DRCC clock divides the clock frequency going into the processing circuit so as to reduce power.

Referring to FIG. 1, in scenario 100, DRCC monitors and tracks a delta voltage that is lower than (by a delta amount) the voltage in concern (e.g., a supply voltage DVDD to the processing circuit) as a DRCC threshold (which is the first threshold voltage of the dual threshold clock control). When the voltage in concern droops below the DRCC threshold in the first droop region, DRCC clock divides the clock frequency going into the processing circuit so as to reduce power, thereby preventing further voltage drooping. That is, due to loop transform, the voltage bounces back up. Given that the DRCC threshold tracks the supply voltage DVDD, DRCC would not be triggered for a subsequent droop in the DC droop region.

DRCC is fast acting with a small response time (e.g., 2~3 nanoseconds (ns)) and, thus, suitable for sensing and regulating the first droop in the voltage that is typically cause mainly by di/dt (voltage tanking due to initial loading) and also by capacitance of the chip die as well as the inductance of the chip package. As DRCC low-pass filters the voltage in concern (e.g., DVDD) to track the low-pass filtered voltage, the detection threshold of DRCC may be about 3% of the low-pass filtered voltage. Advantageously, no load line compensation would be required. However, due to the low-pass filtering, DRCC may be suitable for sensing and regulating voltage droop in a relatively high frequency range but not in a mid or low frequency range. This is because changes in the voltage in the mid or low frequency range may appear to be DC voltage to DRCC and hence not detected by DRCC.

The technique of supply voltage scanning may involve digitizing the sensed voltage in concern with an analog-to-digital converter (ADC) and encoding for post processing to determine, based on the digitized input voltage, a voltage minima inside a chip in which the processing circuit is packaged. Thus, the technique of supply voltage scanning may be considered as an on-die monitoring voltage comparator. When a subsequent droop in the monitored voltage level is sensed (e.g., ripple caused by load transient between inductance of package through on-die capacitors), supply voltage scanning may also send a clock gating signal (labeled as "SESv6 clock divide" in FIG. 1) to dither the clock frequency of the voltage in concern. That is, when the voltage in concern droops below a supply voltage scanning threshold (which is the second threshold voltage of the dual threshold clock control), supply voltage scanning may dither the clock frequency of the voltage in concern. That is, supply voltage scanning may clock divide the clock frequency going into the processing circuit so as to reduce power.

Referring to FIG. 1, in scenario 100, supply voltage scanning monitors the voltage in concern (e.g., a supply voltage DVDD to the processing circuit). When the voltage in concern droops below the supply voltage scanning threshold (labeled as "SESV6 threshold" in FIG. 1) in the DC droop region, supply voltage scanning may send a signal (labeled as "SESV6 clock divide" in FIG. 1) to clock divide the clock frequency going into the processing circuit so as to reduce power, thereby preventing further voltage drooping. This would keep the resultant voltage to stay above the second threshold voltage and droop no further.

The response time of supply voltage scanning (e.g., 2~10 microseconds (μs)) may be longer than that of DRCC and, hence, may be suitable for a second droop (and even a third droop) determined by capacitance of a printed circuit board (PCB) on which the processing circuit is mounted and PMIC limited bandwidth response. The detection threshold, or supply voltage scanning threshold (which is the second threshold voltage of dual threshold clock control), may be an absolute voltage level (e.g., 7~8% of PMIC setting), which may be bandgap based. Advantageously, supply voltage sensing may complement DRCC as supply voltage sensing in accordance with the present disclosure may be suitable for sensing and regulating voltage droop in the mid and low frequency ranges.

In FIG. 1, the dark solid curve represents an input voltage (e.g., supply voltage DVDD to the processing circuit) without protection of dual threshold clock control in accordance with the present disclosure. Without the protection, the input voltage would suffer a first droop (e.g., due to di/dt) and one or more subsequent droops (e.g., due to ripple(s)). With the protection of dual threshold clock control in accordance with the present disclosure, the input voltage may be regulated to prevent or otherwise mitigate droops. In particular, by regulating the input voltage with dual threshold clock control, a resultant voltage, represented by a dashed curve, may result. As shown in FIG. 1, the first droop of the resultant voltage does not dip below the DRCC threshold (or the first threshold voltage) as much as it would without the protection. Moreover, the second droop may be mitigated or otherwise minimized so that the resultant voltage may stay around and above the SESV6 threshold (or the second threshold voltage).

Illustrative Implementations

Figure 2:
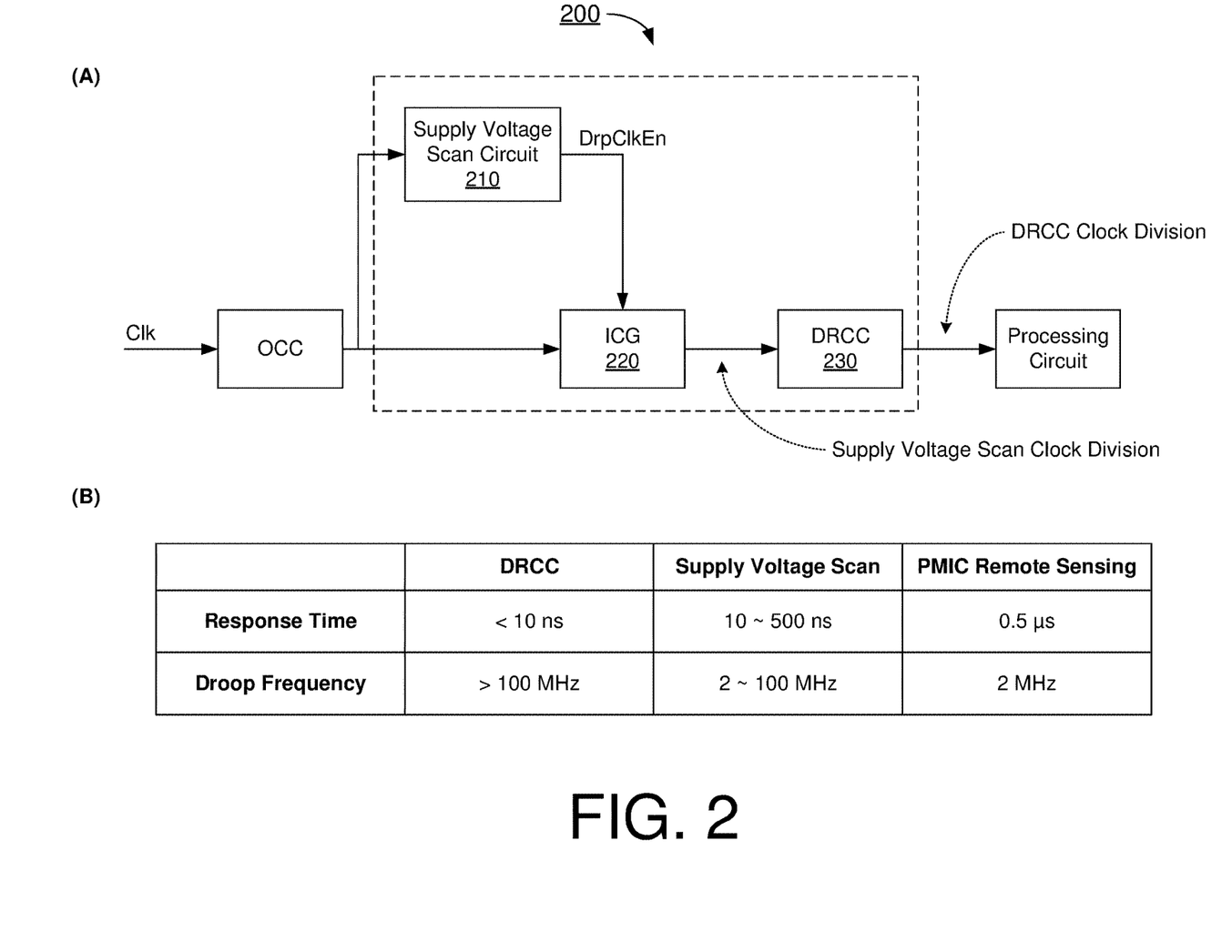
FIG. 2 is a diagram of an example DTCC circuit in accordance with an implementation of the present disclosure.

FIG. 2 illustrates an example DTCC circuit 200 for dual threshold clock control in accordance with an implementation of the present disclosure. DTCC circuit 200 may include a supply voltage scan circuit 210, an integrated clock gating (ICG) circuit 220, and a DRCC circuit 230. DRCC circuit 230 may form the first mechanism, and perform corresponding functions, as described above. Supply voltage scan circuit 210 and ICG circuit 220 together may form the second mechanism, and perform corresponding functions, as described above.

As shown in part (A) of FIG. 2, DRCC circuit 230 and supply voltage scan circuit 210 may be coupled to receive a clock signal (labeled as "Clk" in FIG. 2) from an oscillator clock circuit (OCC). Moreover, DRCC circuit 230 and supply voltage scan circuit 210 may be coupled (not shown) to sense an input voltage of a processing circuit (e.g., supply voltage DVDD). Processing circuit may be, for example and without limitation, a central processing unit (CPU), graphics processing unit (GPU) or vision processing unit (VPU). It is noteworthy that, although in FIG. 2 DTCC circuit 200 is depicted to be separate from and coupled to a processing circuit, in various implementations DTCC circuit 200 may be an integral part (e.g., on die) of the processing circuit and packaged within a single chip.

Under a proposed scheme in accordance with the present disclosure, DTCC circuit 200 may be capable of dual threshold clock control by performing a number of operations. For instance, DTCC circuit 200 may sense the input voltage of the processing circuit, and DTCC circuit 200 may regulate the input voltage to prevent or otherwise mitigate voltage droops. In some implementations, DTCC circuit 200 may regulate a first droop of the input voltage using the first mechanism (e.g., DRCC circuit 230). Additionally, DTCC circuit 200 may regulate a subsequent droop of the input voltage after the first droop using the second mechanism (e.g., supply voltage scan circuit 210 and ICG circuit 220).

In some implementations, in regulating the first droop of the input voltage, DTCC circuit 200 may be capable of regulating the first droop of the input voltage in a first frequency range (e.g., a high frequency range). Moreover, in regulating the subsequent droop of the input voltage, DTCC circuit 200 may be capable of regulating the subsequent droop of the input voltage in a second frequency range (e.g., a mid and low frequency range) lower than the first frequency range.

In some implementations, in regulating the first droop of the input voltage, DTCC circuit 200 may be capable of regulating the first droop of the input voltage responsive to the first droop of the input voltage falling below a first threshold voltage (e.g., DRCC threshold in FIG. 1). Additionally, in regulating the subsequent droop of the input voltage, DTCC circuit 200 may be capable of regulating the subsequent droop of the input voltage responsive to the subsequent droop of the input voltage falling below a second threshold voltage (e.g., SESV6 threshold in FIG. 1) lower than the first threshold voltage.

In some implementations, in regulating the first droop of the input voltage, DRCC circuit 230 may be capable of performing a number of operations. For instance, DRCC circuit 230 may low-pass filter the input voltage and track the low-pass filtered input voltage. Moreover, DRCC circuit 230 may dither a clock frequency of the input voltage responsive to the low-pass filtered input voltage falling below the first threshold voltage.

In some implementations, in regulating the second droop of the input voltage, supply voltage scan circuit 210 may perform a number of operations. For instance, supply voltage scan circuit 210 may be capable of digitizing the input voltage. In an event that the input voltage falls below the second threshold voltage which is lower than the first threshold voltage, supply voltage scan circuit 210 may be capable of determining, based on the digitized input voltage, an amount of clock gating to apply to the input voltage. Moreover, supply voltage scan circuit 210 may be capable of dithering the clock frequency of the input voltage using ICG circuit 220.

In some implementations, in dithering the clock frequency of the input voltage using ICG circuit 220, supply voltage scan circuit 210 may be capable of providing an enable signal to ICG circuit 220 (e.g., a droop clock enable signal, labeled as "DrpClkEn" in FIG. 2). Moreover, ICG circuit 220 may apply one of a plurality of patterns to the enable signal. In some implementations, in applying the respective pattern, ICG circuit 220 may be capable of applying the respective pattern of a string of binary values in sequence from left to right each clock cycle.

Figure 3:
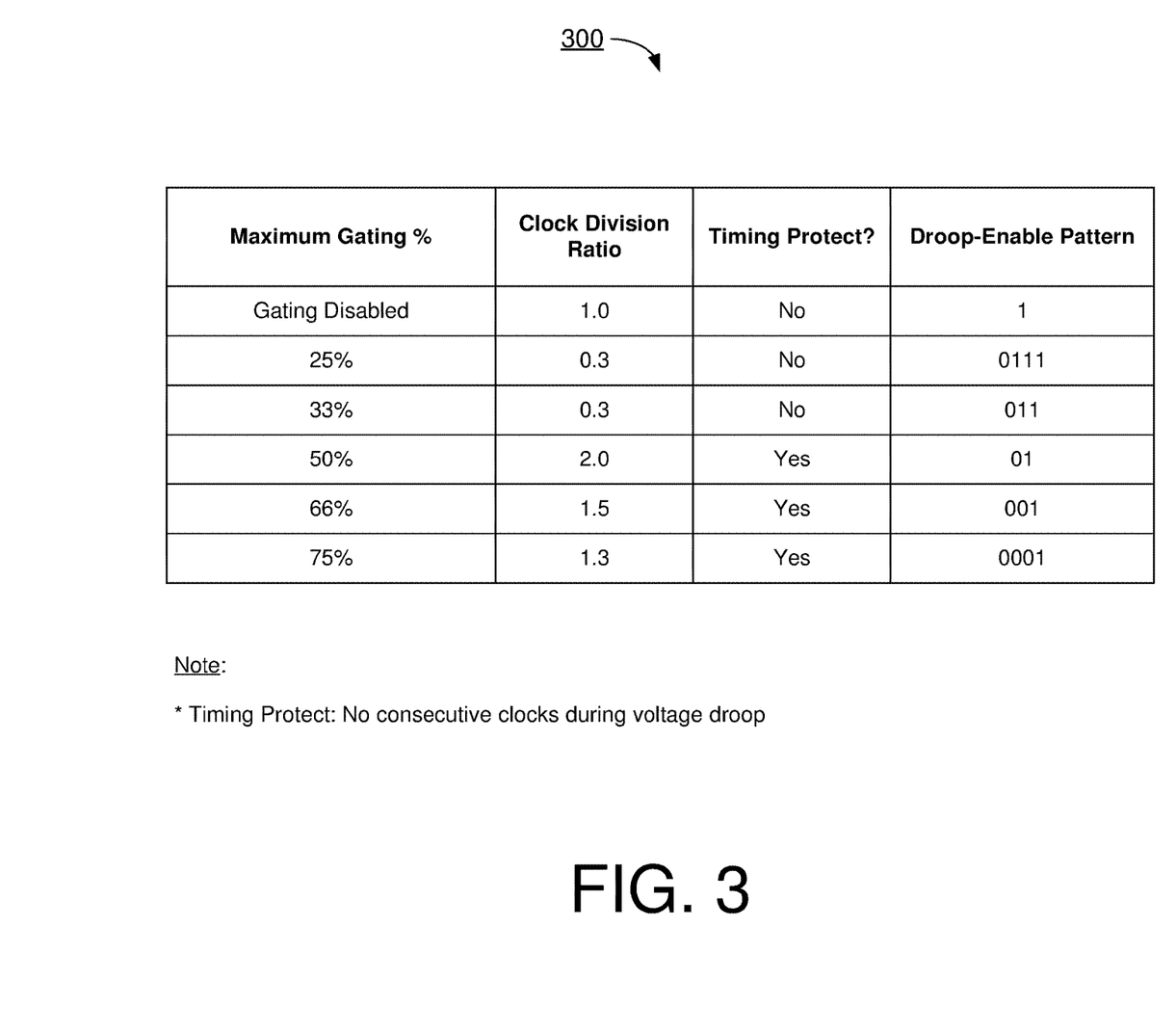
FIG. 3 is a table utilized by an example DTCC circuit in accordance with an implementation of the present disclosure.

FIG. 3 illustrates a table 300 utilized by DTCC circuit 200 in accordance with an implementation of the present disclosure. In some implementations, in applying the one of the plurality of patterns, ICG circuit 220 may be capable of applying a respective pattern among the plurality of patterns corresponding to an amount of clock gating applied to the clock frequency of the input voltage. That is, supply voltage scan circuit 210 may first determine an amount of clock gating to be applied by ICG circuit 220 and then generate the droop clock enable signal with a pattern of a series of binary values corresponding to the amount of clock gating. For example, when supply voltage scan circuit 210 determines to perform a 50% clock gating, a droop-enable pattern in the droop clock enable signal may be "01" (e.g., by clock gating for the clock cycle corresponding to "0" and not clock gating for the clock cycle corresponding to "1"). As another example, when supply voltage scan circuit 210 determines to perform a 25% clock gating, a droop-enable pattern in the droop clock enable signal may be "0111" (e.g., by clock gating for the clock cycle corresponding to "0" and not clock gating for the clock cycle corresponding to "1"). As a further example, when supply voltage scan circuit 210 determines to perform a 75% clock gating, a droop-enable pattern in the droop clock enable signal may be "0001" (e.g., by clock gating for the clock cycle corresponding to "0" and not clock gating for the clock cycle corresponding to "1"). In each case, ICG circuit 220 may apply the respective pattern of a string of binary values in sequence from left to right each clock cycle. For instance, for 50% clock gating, ICG circuit 220 may first apply "0" (e.g., clock gating enabled) and then apply "1" (e.g., clock gating disabled).

Turning back to part (B) of FIG. 2, in some implementations, a response time of the first mechanism (e.g., DRCC circuit 230) may be less than 10 nanoseconds (ns). Moreover, in regulating the first droop of the input voltage, the first mechanism may be capable of regulating the first droop of the input voltage when a droop frequency of the input voltage is greater than 100 MHz.

Also as shown in part (B) of FIG. 2, in some implementations, a response time of the second mechanism (e.g., supply voltage scan circuit 210 and ICG circuit 230) may be between 10 ns and 500 ns. Furthermore, in regulating the second droop of the input voltage, the second mechanism may be capable of regulating the second droop of the input voltage when a droop frequency of the input voltage is between 2 MHz and 100 MHz. In comparison, the response time of remote sensing with PMIC may be 5 μs, and the droop frequency for which PMIC is effective is around 2 MHz.

Figure 4:
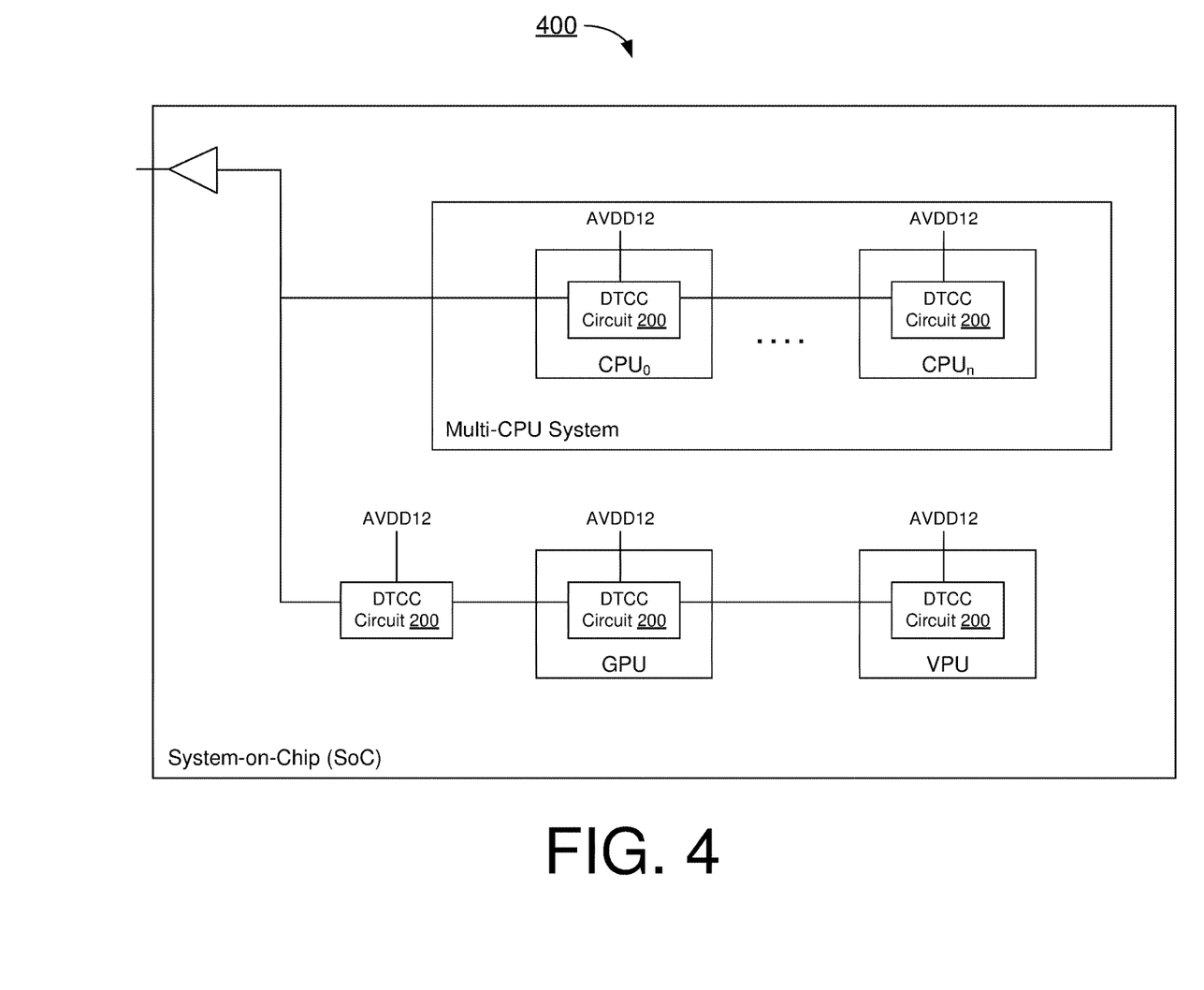
FIG. 4 is a diagram of an example apparatus in accordance with an implementation of the present disclosure.

FIG. 4 illustrates an example apparatus 400 in accordance with an implementation of the present disclosure. Apparatus 400 may be, for example and without limitation, an SoC device in the form of a packaged chip or chip set. Alternatively, apparatus 400 may be a different type of electronic apparatus where dual threshold clock control in accordance with the present disclosure may be implemented.

In the example shown in FIG. 4, apparatus 400 may include a multi-CPU system with one or more CPU's represented by $CPU_0$~$CPU_n$, with n being a positive integer greater than or equal to 1. Each of $CPU_0$~$CPU_n$ may be equipped with DTCC circuit 200 to provide dual threshold clock control to prevent or otherwise mitigate voltage droops. Additionally, or alternatively, apparatus 400 may include a GPU and/or a VPU. Each of the GPU and VPU may be equipped with DTCC circuit 200 to provide dual threshold clock control to prevent or otherwise mitigate voltage droops. Additionally, or alternatively, apparatus 400 may include a DTCC circuit 200 that provides dual threshold clock control to prevent or otherwise mitigate voltage droops in one or more other circuitry of apparatus 400 (not shown). The functions and features of dual threshold clock control described above with respect to FIG. 1~FIG. 3 are applicable to DTCC circuit 200 in apparatus 400. Accordingly, in the interest of brevity, a detailed description of DTCC circuit 200 in apparatus 400 is not provided so as to avoid redundancy.

Illustrative Processes

Figure 5:
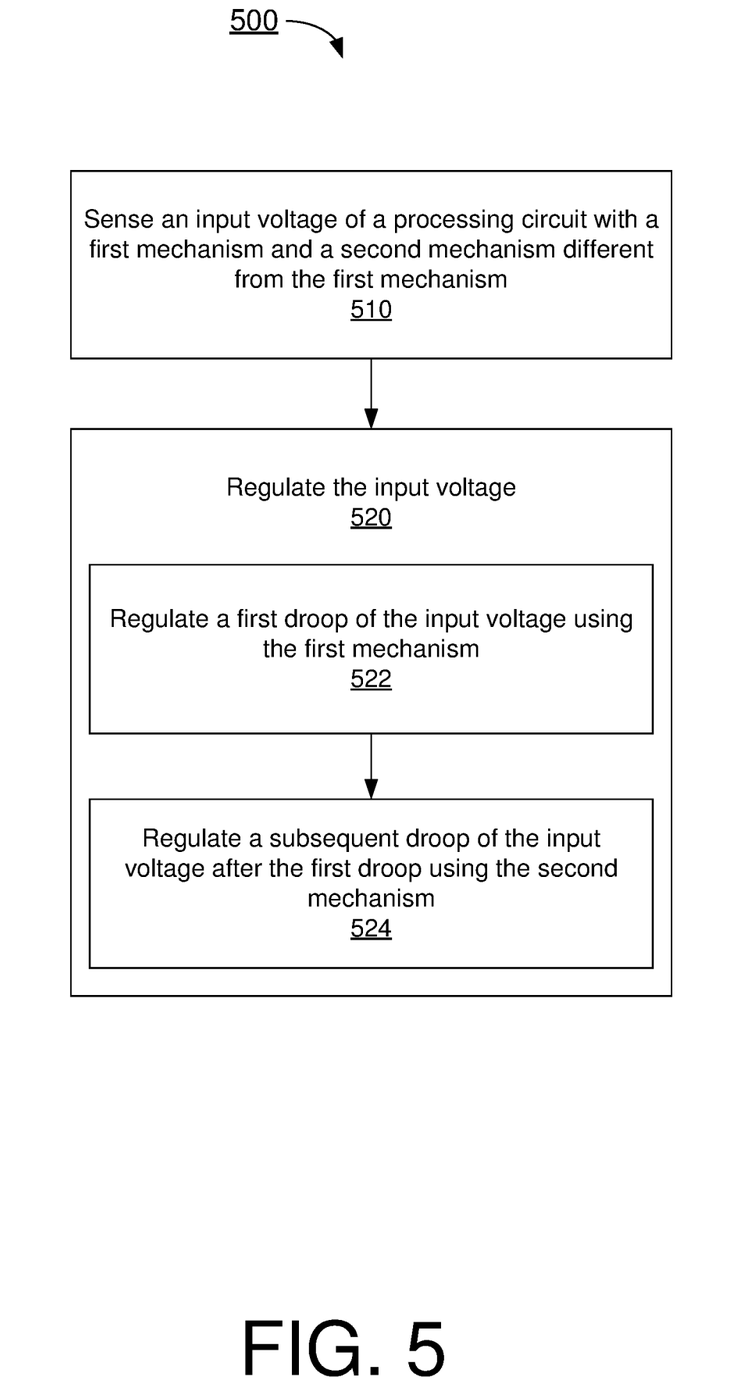
FIG. 5 is a flowchart of an example process in accordance with an implementation of the present disclosure.

FIG. 5 illustrates an example process 500 in accordance with an implementation of the present disclosure. Process 500 may be an example implementation of the various procedures, scenarios, schemes, solutions, concepts and techniques, or a combination thereof, whether partially or completely, with respect to dual threshold clock control in accordance with the present disclosure. Process 500 may represent an aspect of implementation of features of DTCC circuit 200 and/or apparatus 400. Process 500 may include one or more operations, actions, or functions as illustrated by one or more of blocks 510 and 520 as well as sub-block 522 and 524. Although illustrated as discrete blocks, various blocks of process 500 may be divided into additional blocks, combined into fewer blocks, or eliminated, depending on the desired implementation. Moreover, the blocks of process 500 may executed in the order shown in FIG. 5 or, alternatively, in a different order. Furthermore, one or more of the blocks of process 500 may be repeated one or more times. Process 500 may be implemented by DTCC circuit 200 and/or apparatus 400. Solely for illustrative purposes and without limitation, process 500 is described below in the context of DTCC circuit 200. Process 500 may begin at block 510.

At 510, process 500 may involve DTCC circuit 200 sensing an input voltage of a processing circuit with a first mechanism (e.g., DRCC circuit 230) and a second mechanism (e.g., supply voltage scan circuit 210) different from the first mechanism. Process 500 may proceed from 510 to 520.

At 520, process 500 may involve DTCC circuit 200 regulating the input voltage, represented by sub-blocks 522 and 524.

At 522, process 500 may involve DRCC circuit 230 regulating a first droop of the input voltage. Process 500 may proceed from 522 to 524.

At 524, process 500 may involve supply voltage scan circuit 210 regulating a subsequent droop of the input voltage after the first droop using the second mechanism.

In some implementations, in regulating the first droop of the input voltage, process 500 may involve DRCC circuit 230 regulating the first droop of the input voltage in a first frequency range (e.g., >100 MHz). Additionally, in regulating the subsequent droop of the input voltage, process 500 may involve supply voltage scan circuit 210 regulating the subsequent droop of the input voltage in a second frequency range (e.g., 2~100 MHz) lower than the first frequency range.

In some implementations, in regulating the first droop of the input voltage, process 500 may involve DRCC circuit 230 regulating the first droop of the input voltage responsive to the first droop of the input voltage falling below a first threshold voltage. Moreover, in regulating the subsequent droop of the input voltage, process 500 may involve supply voltage scan circuit 210 regulating the subsequent droop of the input voltage responsive to the subsequent droop of the input voltage falling below a second threshold voltage lower than the first threshold voltage.

In some implementations, in regulating the first droop of the input voltage, process 500 may involve DRCC circuit 230 performing a number of operations. For instance, process 500 may involve DRCC circuit 230 low-pass filtering the input voltage. Additionally, process 500 may involve DRCC circuit 230 tracking the low-pass filtered input voltage. Moreover, process 500 may involve DRCC circuit 230 dithering a clock frequency of the input voltage responsive to the low-pass filtered input voltage falling below a first threshold voltage. For instance, DRCC circuit 230 may divide the clock frequency according to table 300.

In some implementations, in regulating the second droop of the input voltage, process 500 may involve supply voltage scan circuit 210 performing a number of operations. For instance, process 500 may involve supply voltage scan circuit 210 digitizing the input voltage. In an event that the input voltage falls below a second threshold voltage lower than the first threshold voltage, process 500 may involve supply voltage scan circuit 210 determining, based on the digitized input voltage, an amount of clock gating to apply to the input voltage. Furthermore, process 500 may involve supply voltage scan circuit 210 dithering the clock frequency of the input voltage using ICG circuit 220.

In some implementations, in dithering the clock frequency of the input voltage using ICG circuit 220, process 500 may involve supply voltage scan circuit 210 providing an enable signal to ICG circuit 220. Additionally, process 500 may involve ICG circuit 220 applying one of a plurality of patterns (e.g., droop-enable patterns in table 300) to the enable signal. In some implementations, in applying the one of the plurality of patterns, process 500 may involve ICG circuit 220 applying a respective pattern among the plurality of patterns corresponding to an amount of clock gating applied to the clock frequency of the input voltage. In some implementations, in applying the respective pattern, process 500 may involve ICG circuit 220 applying the respective pattern of a string of binary values in sequence from left to right each clock cycle.

In some implementations, a response time of the first mechanism (e.g., DRCC circuit 230) may be less than 10 ns. In some implementations, in regulating the first droop of the input voltage using the first mechanism, process 500 may involve DRCC circuit 230 regulating the first droop of the input voltage when a droop frequency of the input voltage is greater than 100 MHz.

In some implementations, a response time of the second mechanism (e.g., supply voltage scan circuit 210) may be between 10 ns and 500 ns. In some implementations, in regulating the second droop of the input voltage using the second mechanism, process 500 may involve supply voltage scan circuit 210 regulating the second droop of the input voltage when a droop frequency of the input voltage is between 2 MHz and 100 MHz.

In some implementations, the processing circuit comprises a CPU, a GPU or a VPU.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least,"

the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
    sensing an input voltage of a processing circuit with a first mechanism and a second mechanism different from the first mechanism; and
    regulating the input voltage by:
        regulating a first droop of the input voltage using the first mechanism; and
        regulating a subsequent droop of the input voltage after the first droop using the second mechanism.

2. The method of claim 1, wherein the regulating of the first droop of the input voltage comprises regulating the first droop of the input voltage in a first frequency range, and wherein the regulating of the subsequent droop of the input voltage comprises regulating the subsequent droop of the input voltage in a second frequency range lower than the first frequency range.

3. The method of claim 1, wherein the regulating of the first droop of the input voltage comprises regulating the first droop of the input voltage responsive to the first droop of the input voltage falling below a first threshold voltage, and wherein the regulating of the subsequent droop of the input voltage comprises regulating the subsequent droop of the input voltage responsive to the subsequent droop of the input voltage falling below a second threshold voltage lower than the first threshold voltage.

4. The method of claim 1, wherein the regulating of the first droop of the input voltage using the first mechanism comprises:
    low-pass filtering the input voltage;
    tracking the low-pass filtered input voltage;
    dithering a clock frequency of the input voltage responsive to the low-pass filtered input voltage falling below a first threshold voltage.

5. The method of claim 4, wherein the regulating of the second droop of the input voltage using the second mechanism comprises:
    digitizing the input voltage;
    determining, based on the digitized input voltage, an amount of clock gating to apply to the input voltage responsive to the input voltage falling below a second threshold voltage lower than the first threshold voltage; and
    dithering the clock frequency of the input voltage using an integrated clock gating (ICG) circuit.

6. The method of claim 5, wherein the dithering of the clock frequency of the input voltage using the ICG circuit comprises:
    providing an enable signal to the ICG circuit; and
    applying, by the ICG circuit, one of a plurality of patterns to the enable signal,
    wherein the applying of the one of the plurality of patterns comprises applying a respective pattern among the plurality of patterns corresponding to an amount of clock gating applied to the clock frequency of the input voltage.

7. The method of claim 6, wherein the applying of the respective pattern comprises applying the respective pattern of a string of binary values in sequence from left to right each clock cycle.

8. The method of claim 1, wherein a response time of the first mechanism is less than 10 nanoseconds (ns), and wherein the regulating of the first droop of the input voltage using the first mechanism comprises regulating the first droop of the input voltage when a droop frequency of the input voltage is greater than 100 MHz.

9. The method of claim 1, wherein a response time of the second mechanism is between 10 nanoseconds (ns) and 500 ns, and wherein the regulating of the second droop of the input voltage using the second mechanism comprises regulating the second droop of the input voltage when a droop frequency of the input voltage is between 2 MHz and 100 MHz.

10. The method of claim 1, wherein the processing circuit comprises a central processing unit (CPU), a graphics processing unit (GPU) or a vision processing unit (VPU).

11. An apparatus, comprising:
    a dual threshold clock control (DTCC) circuit comprising a first mechanism and a second mechanism, the DTCC circuit capable of:

sensing an input voltage of a processing circuit;
regulating a first droop of the input voltage using the first mechanism; and
regulating a subsequent droop of the input voltage after the first droop using the second mechanism.

12. The apparatus of claim 11, wherein, in regulating the first droop of the input voltage, the DTCC circuit is capable of regulating the first droop of the input voltage in a first frequency range, and wherein, in regulating the subsequent droop of the input voltage, the DTCC circuit is capable of regulating the subsequent droop of the input voltage in a second frequency range lower than the first frequency range.

13. The apparatus of claim 11, wherein, in regulating the first droop of the input voltage, the DTCC circuit is capable of regulating the first droop of the input voltage responsive to the first droop of the input voltage falling below a first threshold voltage, and wherein, in regulating the subsequent droop of the input voltage, the DTCC circuit is capable of regulating the subsequent droop of the input voltage responsive to the subsequent droop of the input voltage falling below a second threshold voltage lower than the first threshold voltage.

14. The apparatus of claim 11, wherein, in regulating the first droop of the input voltage, the first mechanism is capable of:
low-pass filtering the input voltage;
tracking the low-pass filtered input voltage;
dithering a clock frequency of the input voltage responsive to the low-pass filtered input voltage falling below a first threshold voltage.

15. The apparatus of claim 14, wherein, in regulating the subsequent droop of the input voltage, the second mechanism is capable of:
digitizing the input voltage;
determining, based on the digitized input voltage, an amount of clock gating to apply to the input voltage responsive to the input voltage falling below a second threshold voltage lower than the first threshold voltage; and
dithering the clock frequency of the input voltage using an integrated clock gating (ICG) circuit.

16. The apparatus of claim 15, wherein, in dithering the clock frequency of the input voltage using the ICG circuit, the second mechanism is capable of:
providing an enable signal to the ICG circuit; and
applying, by the ICG circuit, one of a plurality of patterns to the enable signal,
wherein, in applying the one of the plurality of patterns, the ICG circuit is capable of applying a respective pattern among the plurality of patterns corresponding to an amount of clock gating applied to the clock frequency of the input voltage.

17. The apparatus of claim 16, wherein, in applying the respective pattern, the ICG circuit is capable of applying the respective pattern of a string of binary values in sequence from left to right each clock cycle.

18. The apparatus of claim 11, wherein a response time of the first mechanism is less than 10 nanoseconds (ns), and wherein, in regulating the first droop of the input voltage, the first mechanism is capable of regulating the first droop of the input voltage when a droop frequency of the input voltage is greater than 100 MHz.

19. The apparatus of claim 11, wherein a response time of the second mechanism is between 10 nanoseconds (ns) and 500 ns, and wherein, in regulating the second droop of the input voltage, the second mechanism is capable of regulating the second droop of the input voltage when a droop frequency of the input voltage is between 2 MHz and 100 MHz.

20. The apparatus of claim 11, further comprising:
the processing circuit,
wherein the processing circuit comprises a central processing unit (CPU), a graphics processing unit (GPU) or a vision processing unit (VPU).

* * * * *